United States Patent
Michaelis

(10) Patent No.: US 7,171,004 B2
(45) Date of Patent: Jan. 30, 2007

(54) ROOM ACOUSTICS ECHO METER FOR VOICE TERMINALS

(75) Inventor: Paul R. Michaelis, Louisville, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 314 days.

(21) Appl. No.: 10/212,968

(22) Filed: Aug. 5, 2002

(65) Prior Publication Data

US 2004/0022394 A1    Feb. 5, 2004

(51) Int. Cl.
    *H04B 3/20*    (2006.01)
(52) U.S. Cl. .................. 381/66; 379/388.02; 381/56
(58) Field of Classification Search ............. 381/66, 381/83, 93, 56; 379/406.01–406.16, 388.01, 379/388.02
    See application file for complete search history.

(56) References Cited

U.S. PATENT DOCUMENTS

| | | | | |
|---|---|---|---|---|
| 3,786,188 A | * | 1/1974 | Allen | .......................... 704/263 |
| 4,131,760 A | * | 12/1978 | Christensen et al. | .......... 381/66 |
| 4,272,990 A | * | 6/1981 | Hiemann et al. | .............. 73/586 |
| 5,570,423 A | * | 10/1996 | Walker et al. | ......... 379/406.09 |
| 5,577,116 A | * | 11/1996 | Townsend et al. | ...... 379/406.12 |
| 5,970,137 A | * | 10/1999 | Le Damany et al. | ... 379/388.01 |
| 5,970,154 A | * | 10/1999 | Chen et al. | .................... 381/66 |
| 6,507,653 B1 | * | 1/2003 | Romesburg | ............ 379/406.05 |
| 2003/0138117 A1 | * | 7/2003 | Goff | ........................... 381/103 |

* cited by examiner

*Primary Examiner*—Brian T. Pendleton
(74) *Attorney, Agent, or Firm*—Sheridan Ross P.C.

(57) ABSTRACT

The present invention provides an indication to the user of a voice communication system that an echo at the user's location has been detected by the system. In response to receiving this indication of echo, users may take any of several actions to reduce the echo, such as changing the position of the microphone or changing their own position with respect to the microphone. The need for potentially expensive echo-canceling hardware and software is reduced because the actions to eliminate the echo are performed by the user. The echo detector in the present invention may be implemented as part of a voice terminal, or as part of a communication switch or server that is used in conjunction with a voice terminal.

29 Claims, 3 Drawing Sheets

ROOM ACOUSTICS ECHO METER FOR VOICE TERMINALS

FIELD OF THE INVENTION

The present invention is directed to providing an indication of the presence of an echo in an outgoing telephone signal. In particular, the present invention relates to providing a user with an indication that echo is present in a signal, so that a user can take appropriate action.

BACKGROUND OF THE INVENTION

Voice communication systems, including telephone systems, are subject to several sources of echo that make transmitted voices sound bad to listeners. These echoes can noticeably degrade the intelligibility and quality of the transmitted voice signal. One source of echo is simple acoustic reverberation at the talker's physical location. Echoes associated with acoustic reverberation at the talker's physical location are particularly evident in connection with speaker phones. However, it is often the case that people speaking into a speakerphone within small enclosed environments, such as offices or conference rooms, are unaware of such echoes.

Attempts at reducing echo in transmitted voices have included physically modifying room acoustics. Such physical modifications can be made by, for example, placing echo dampening material on the walls and ceilings. However, such modifications can be expensive. In addition, such modifications may not be possible or appropriate to all rooms in which the use of a speaker phone is desirable. Furthermore, a change in the arrangement of furniture in a room, or in the position of the speaker phone within the room, can result in the introduction of echo to a transmitted voice signal, even though previously there had been no echo.

Other attempts at reducing echo in outgoing signals have included placing individual microphones as close as possible to talkers. For example, requiring talkers to speak into microphones positioned directly in front of the talker's mouth, for example as part of a handset or headset, can be effective in reducing acoustic echo. However, it is not always convenient or desirable to hold a handset or to wear a headset. Furthermore, although microphones can be placed in front of individual talkers, for example in a conference call scenario with multiple talkers at a location using a speaker phone, the problem of acoustic reverberation at the physical location may not be entirely avoided.

Still another attempt at reducing the effect of echo or acoustic reverberation in outgoing voice communication signals is the use of highly directional microphone designs. Directional microphones may be deployed singly or in arrays, and are capable of accepting or rejecting sounds depending on their point of origin. However, directional microphones are relatively expensive, can be difficult to properly set up, and do not work well when a talker is moving about their physical location.

Yet another attempt at reducing echo in voice communications is the use of signal processing techniques to compensate for or remove the echo. Generally, such techniques require the deployment of a digital signal processor capable of detecting and compensating for the echo. Although such techniques can be effective at reducing the effects of acoustic reverberation, they are relatively expensive to develop and deploy.

SUMMARY OF THE INVENTION

The present invention is directed to solving these and other problems and disadvantages of the prior art. Generally, according to the present invention, the presence of acoustic reverberation or echo in a voice signal is detected. The user or talker is then notified of the acoustic reverberation, so that the user can take appropriate steps to mitigate the acoustic reverberation. For example, in response to receiving an indication that acoustic reverberation is present, the user may change their position, the position of the microphone receiving the voice signal provided by the user may be changed, or both the user's and the microphone's physical location may be altered. If an initial change in the physical location of the user and/or the microphone is not effective in removing the echo, the user may continue to alter their position and/or the position of the microphone until the presence of acoustic reverberation in the transmitted voice signal is eliminated or reduced.

In accordance with an embodiment of the present invention, a voice signal provided by a user is converted into an electronic signal by a microphone. The electronic signal is then provided to an echo detector. If the echo detector determines that there is an echo in the transmitted voice signal, an output signal notifying the user of the presence of echo is provided. In accordance with an embodiment of the present invention, the output signal comprises a visual indication of the presence of an echo. In accordance with another embodiment of the present invention, the presence of echo is provided by an audible signal. In accordance with still another embodiment of the present invention, the output signal provides an indication of the magnitude of the detected echo.

In accordance with an embodiment of the present invention, the components of a system for providing an indication of the presence of an echo in a transmitted voice signal are provided as part of a voice terminal. For example, such a system may be provided as part of a speaker phone. As a further example, the system may be provided as part of or in connection with a soft telephone.

In accordance with yet another embodiment of the present invention, certain components or features of a system for providing an indication of the presence of an echo may be provided by a voice terminal, while other components or features are provided by an interconnected communications server or switch. For example, an electronic representation of a voice signal provided by a user may be generated in a voice terminal, and the detection of an echo in the transmitted voice signal may be performed in a communication server. The communication sever may signal the voice terminal that echo has been detected, and the user may in turn be provided with an indication of the presence of echo by the voice terminal.

These and other advantages and features of the invention will become more apparent from the following discussion, particularly when taken together with the accompanying drawings.

DETAILED DESCRIPTION

The present invention is directed to signaling the presence of echo in a transmitted voice signal to a user.

Figure 1A:
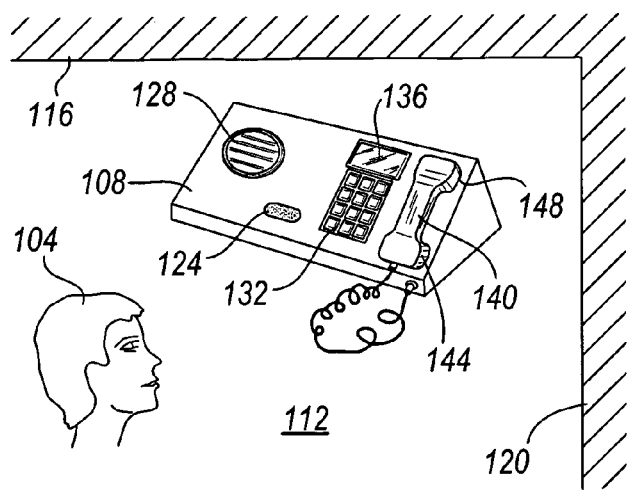
FIG. 1A depicts the physical relationship between a user and a voice terminal in a room in a first example.
Figure 1B:
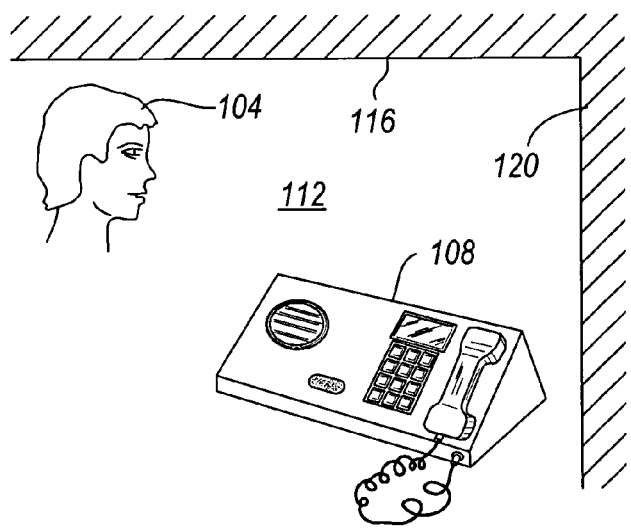
FIG. 1B depicts the physical relationship between a user and a voice terminal in a room in accordance with another example.
Figure 1C:
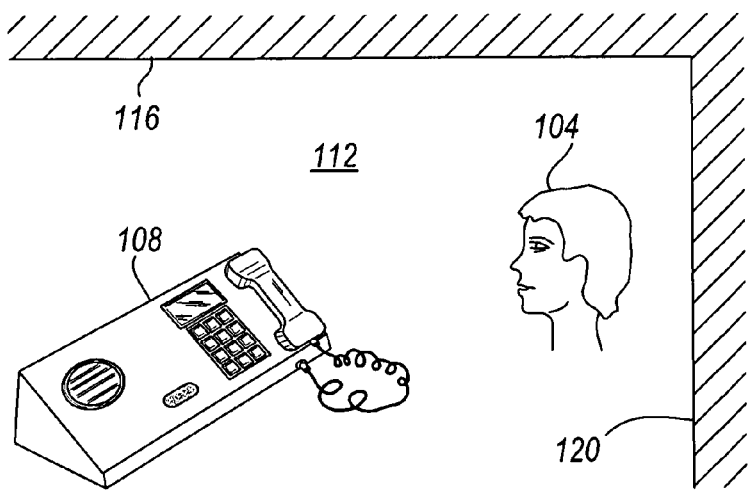
FIG. 1C depicts the physical relationship between a user and a voice terminal in a room in accordance with still another example.

In FIGS. 1A to 1C, examples of different relative positions of a user or talker 104 and a voice terminal or voice communication device 108 within a room 112 are shown. In addition, a first wall 116 and a second wall 120 of the room 112 are illustrated. The voice terminal 108 generally includes a far talk microphone 124 and a broadcast speaker 128 for facilitating speaker phone operation. In addition, the voice terminal 108 illustrated in FIGS. 1A to 1C includes a key pad 132, a display 136, and a handset 140. The handset 140 in turn includes a microphone 144 and a speaker 148. As can be appreciated, not all of the features 124–148 illustrated in connection with the voice terminal 108 as shown in FIGS. 1A–1C must be provided. Furthermore, additional features may be provided if desired.

The voice terminal 108 may generally comprise a conventional telephone or speaker phone. In addition, the voice terminal 108 may comprise a soft or Internet protocol (IP) telephone. In general, the far talk microphone 124, if provided, is configured for receiving voice signals provided by a user even if the far talk microphone 124 is not positioned directly in front of the user's mouth. The broadcast speaker 128 is generally configured for providing audible output to the user 104 even if the user's ear is not positioned directly in front of the speaker 128. The handset 140 generally provides a microphone 144 and a speaker 148 that are configured for use when positioned generally in front of the user's mouth and ear, respectively. As can be appreciated, the voice terminal 108 may provide various alternative combinations of microphones 124, 144 and speakers 128, 148.

The keypad 132 may include any device suitable for receiving input from the user 104. Accordingly, the keypad 132 may include a numeric keypad or a textual keypad. In addition, the user input functions of the keypad may be performed in connection with a voice recognition algorithm provided by the voice terminal 108 or an interconnected communication server or switch. The display 136 may include a numeric display, bar graph, colored and/or labeled indicator lights, or a configurable display comprising, for example, a cathode ray tube or a liquid crystal display. As can also be appreciated, functions of the keypad 132 and display 136 can be combined, for example in the form of a touch screen.

As can be appreciated by one of skill in the art, acoustic reverberation may result in the transmission of an echo together with a voice signal provided to a voice terminal 108 by a user 104, particularly in connection with voice signals provided through the far talk microphone 124. Such acoustic reverberation may result from features found at the physical location of the voice terminal 108. For instance, in the examples illustrated in FIGS. 1A–1C, the walls 116, 120 of the room 112 can reflect the user's 104 voice. Because the reflected voice signal is delayed as compared to the voice signal that travels directly from the mouth of the user 104 to the microphone 124 or 144, the reflected signal can be perceived as an echo in the transmitted voice signal. Furthermore, features in the room 112 such as the finish of the walls 116, 120, floor coverings, furniture, the position and presence of windows, etc. can all influence the presence and magnitude of acoustic reverberations that result in a perceptible echo. Accordingly, it is difficult to position a user 104 and a voice terminal 108 in a room 112 such that an echo free transmitted voice signal can be assured. In addition, changes to the room 112, for example the opening or closing of a window, window covering, or door, can change the acoustic characteristics of the room 112, thereby altering the position or positions of the user 104 and voice terminal 108 at which echo in the transmitted signal is minimized or held to an acceptable level.

Figure 2A:
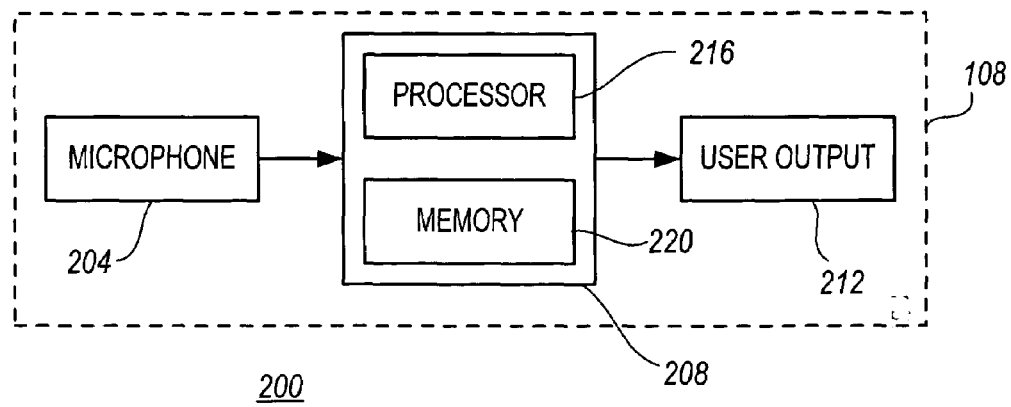
FIG. 2A depicts a system for providing an indication of echo in a transmitted voice communication in accordance with an embodiment of the present invention.
Figure 2B:
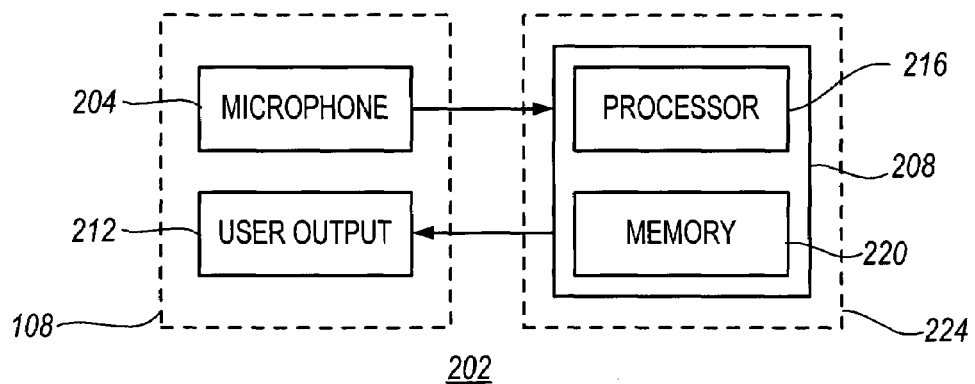
FIG. 2B depicts another system for providing an indication of echo in a transmitted voice communication in accordance with another embodiment of the present invention.

With reference now to FIGS. 2A and 2B, systems 200, 202 having features for providing an indication of echo in a voice transmission in accordance with an embodiment of the present invention are illustrated in block diagram form. The systems 200, 202 generally include a microphone 204, an echo detector 208 and a user output 212. The microphone 204 generally functions as a transceiver that generates digital or analog representations of voice signals received from the user 104, and may comprise a far talk microphone 124 and/or a near talk microphone 144. The echo detector 208 may include a processor 216 and memory 220. In the embodiment illustrated in FIG. 2A, the echo detector 208 is provided as part of a voice terminal 108. As shown in FIG. 2B, the echo detector 208 may also be provided as part of a device 224 that is separate from the voice terminal 108. For example, the device 224 may comprise a communication server or a switch. As a further example, the device 224 may comprise a computer terminal, such as a computer terminal provided in connection with a voice terminal 108, comprising a soft or Internet protocol (IP) telephone. In accordance with an embodiment of the present invention, the processor 216 is a digital signal processor. The memory 220 may be any electronic memory suitable for storing information for use in connection with the operation of the processor 216. For instance, the memory 220 may be used to store programming code that is run on the processor 216 to perform the echo detection of function. In accordance with still another embodiment of the present invention, the echo detector 208, and in particular the processor 216 and memory 220 may be implemented as part of a single integrated circuit, including a controller.

The echo detector 208 analyzes the voice signal received from the microphone 204 to detect the presence of echo. For instance, the echo detector 208 may take a digital representation of a voice signal received from the microphone 204, and provide it to the processor 216, for detection of rippling in the spectral content of the received signal. Alternatively, the processor 216 may determine the presence of echos in the signal directly. The processor 216 may also determine a magnitude of an echo detected in the voice signal. As can be appreciated, the echo detector 208 may additionally comprise an analog to digital converter where an analog signal is received from the microphone 204.

The user output 212 provides an indication to the user 104 regarding the presence of echo in the transmitted voice signal. The user output 212 may provide a visual, audible, or both a visual and audible indication to the user 104. In addition, the user output 212 may simply provide an indication that echo has been detected, or it may additionally provide an indication of the magnitude of the detected echo. For example, the user output 212 may comprise a numerical output for communicating the magnitude of the detected echo. In connection with an audible output 212, a beeping tone that changes frequency with a change in the magnitude of the detected echo may be provided. In accordance with an embodiment of the present invention, the user output 212 is provided by a display 136 included as part of the voice terminal 108 (See FIGS. 1A–1C). In accordance with another embodiment of the present invention, the user output 212 is provided by the speaker 128 or 148 of the voice terminal 108 (See FIGS. 1A–1C).

Figure 3:
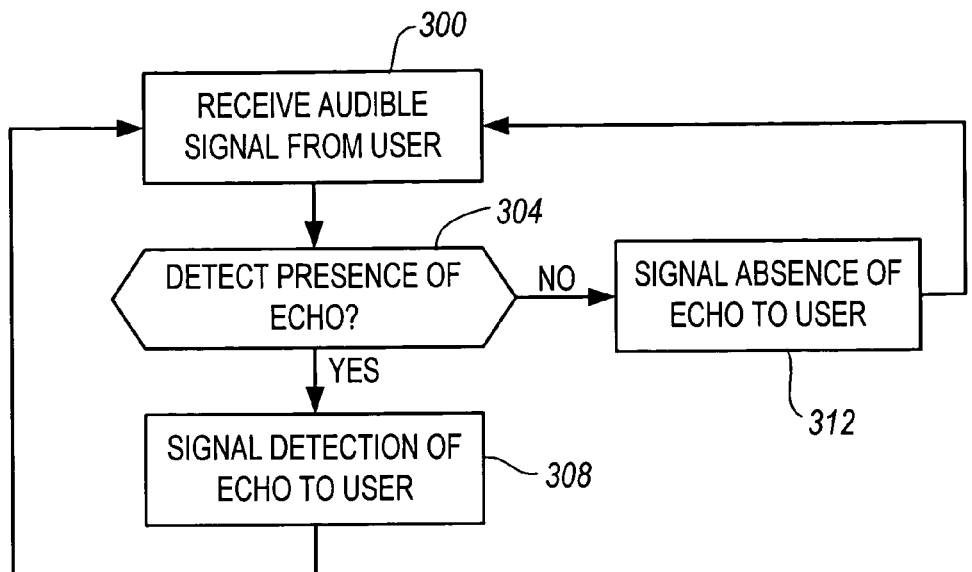
FIG. 3 is a flowchart depicting the operation of a system for providing an indication of echo to a user in accordance with an embodiment of the present invention.

With reference now to FIG. 3, the operation of a system 200 in accordance with an embodiment of the present invention is shown. Initially, at step 300, an audible signal is received from a user or user 104. A determination is then made as to whether the presence of an echo is detected in the voice signal (step 304). As mentioned above, the presence of an echo in the voice signal may be determined in a variety of ways known to those of skill in the art. For example, a ripple or perturbation in the spectral content of the received voice signal may provide an indication of echo in that signal. As a further example, the receipt of a duplicate, time delayed signal may be detected as part of the voice signal, and may result in an indication that echo has been detected if the magnitude of the time delayed signal is found to be large enough that the psycho-acoustic effect of the detected echo associated with the voice signal is significant.

In response to a determination that echo is present in the voice signal, a signal indicating the presence of echo is provided to the user 104 (step 308). As noted above, the signal may be provided as a visual indication, an audible indication, or both a visual and audible indication. For example, a visual indication may be provided in a display 136 included in the voice terminal 108 (See FIGS. 1A–1C). Furthermore, the signal may include an indication of the detected magnitude of the echo, for example in a numeric or sliding bar form. Furthermore, the detection of echo may be signaled by a user output 212 comprising the speaker 128 or 148 of the voice terminal 108. (See FIGS. 1A–1C). An embodiment that provides an audible output is particularly useful in connection with a voice terminal 108 that does not provide a visual display 136.

After the detection of an echo has been signaled to the user 104 (step 308), the system returns to step 300. Accordingly, it can be appreciated that, in accordance with an embodiment of the present invention, the voice signal received from the user 104 is continually monitored for the presence of echo. In response to a failure to detect the presence of echo in a voice signal at step 304, the absence of an echo may be signaled to the user 104 (step 312). The absence of a signal may be provided in a positive fashion by the user output 212. Alternatively, the absence of echo may be signaled by providing no signal to the user 104 regarding echo. That is, a positive output may be provided to a user 104 only when echo having a potentially significant psycho-acoustic effect is detected in connection with a voice signal. Following step 312, the system returns to step 300. Accordingly, it can be appreciated that, in connection with an embodiment of the present invention, the voice signal is continually monitored for the presence of echo.

Figure 4:
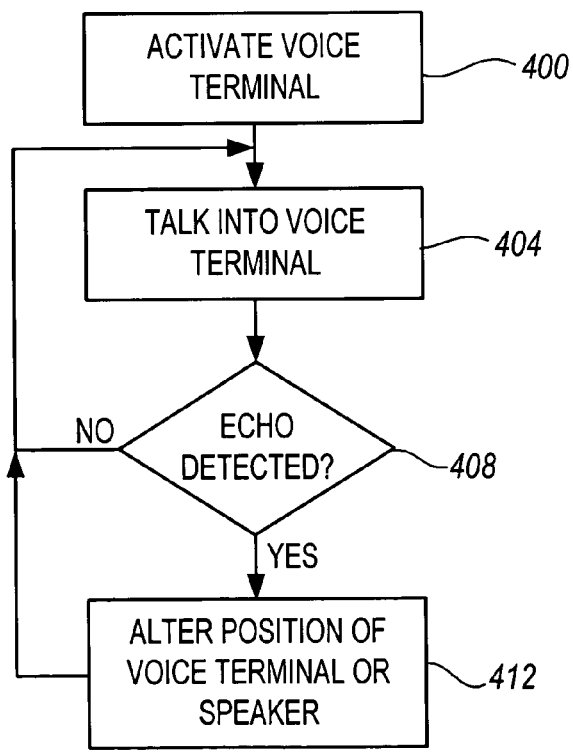
FIG. 4 is a flowchart depicting a method for reducing echo in a transmitted voice signal in accordance with an embodiment of the present invention.

With reference now to FIG. 4, a method for reducing echo in a voice signal for use in connection with a system 200 in accordance with the present invention is shown. Initially, at step 400, the voice terminal 108 is activated. For example, the voice terminal 108 may be placed off hook by pressing an appropriate button provided as part of a key pad 132. Alternatively, the receiver 140 may be lifted. At step 404, the user 104 talks into the voice terminal 108. That is, the user 104 provides a voice signal that is detected by the microphone 124 or 144. At step 408, a determination is made as to whether echo is detected, and the user 104 is signaled accordingly. That is, steps 304, 308 and 312 described above in connection with FIG. 3 are performed. If no echo is detected, the user 104 continues to provide the voice signal normally. That is, the user 104 may continue with a voice communication using the voice terminal 108 with the assurance that there is no significant echo in the provided voice signal, at least as provided from the user 104 to the voice terminal 108.

If echo is detected and signaled to the user 104, the user may alter the position of the voice terminal 108, or the user 104 may alter their position relative to the voice terminal 108 (step 412). Furthermore, both the position of the user 104 and of the voice terminal 108 may be altered. For example, the user 104 and the voice terminal 108 may be positioned in a room 112 as shown in FIG. 1A. In response to receiving a indication that echo is present in the voice signal, the user 104 may alter their position and the position of the voice terminal 108 in the room 112, to the positions shown in FIG. 1B.

After altering the position of the voice terminal 108 and/or the user 104, the user 104 may continue talk into the voice terminal 108 (step 404). The system may then return to step 408 to determine whether echo continues to be detected in the voice signal. If no echo is detected, the user 104 may continue talk into the voice terminal 108 with assurance that any echo associated with the voice signal is not psycho-acoustically significant.

If echo continues to be detected, the system will return to step 412, and the user 104 may again alter the position of the voice terminal 108 and/or the user 104. For example, the user may change their position and the position of the voice terminal 108 from the position shown in FIG. 1B to the position shown in FIG. 1C. The user 104 may then continue to talk into the voice terminal 108 (step 404) and a determination as to whether echo is detected (step 408) may again be made. This process may continue for as long as the user 104 provides a voice signal to the terminal 108, until the user 104 turns off the echo detection feature, or until the user 104 decides to stop making adjustments in response to the echo detection signal.

From the description provided herein, it can be appreciated that a user 104 may adjust their position or the position of a voice terminal 108 continually while providing a voice signal until an echo associated with the voice signal and resulting from acoustic reverberations at the physical location (e.g., the room 112) of the user 104 and the voice terminal 108 is eliminated or reduced. Furthermore, it can be appreciated that the monitoring for echo within a voice signal may be continuous, and that the user 104 may change their position relative to the voice terminal 108 as desired if an indication of echo is received.

As noted above, the echo detector 208 may be provided as part of a communication network provider switch or communication server 224. In connection with such an embodiment, the provision of an audible user output 212 (e.g., through speaker 128 or 148) is particularly useful. Alternatively or in addition, in connection with an embodiment in which the echo detector is located 208 at a site remote from the voice terminal 108, an out of band signal may be provided to the voice terminal to signal the presence of echo, and an output 212 signaling to the user 104 that echo has been detected may be provided.

The present invention may be utilized in connection with standard switched circuit telephony network. For instance, the present invention may be utilized with a voice terminal 108 comprising a standard speaker phone or telephone. Furthermore, where the echo detection function is provided as part of the voice terminal 108, a processor 216 associated with the voice terminal 108 may be modified to perform the echo detector 208 function, or a processor 216 may be especially provided to perform the echo detector 208 function. As can be appreciated, the present invention is particular useful in connection with voice terminals 108 used as speaker phones. However, the present invention may also be utilized to detect echos associated with voice signals received by microphones 144 provided as part of handsets 140 or headsets.

In addition to use in connection with switched telephony circuits, the present invention may be utilized in connection with voice terminals 108 communicating over packet data networks, including the Internet. Furthermore, because of the significant degradation of sound quality that can occur when voice signals transmitted over VoIP networks has an associated echo, the present invention is particularly useful in connection with such networks.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for reducing echo in voice communication signals, comprising:
    receiving a first voice signal from at least a first user, wherein said receiving is performed using only a single microphone;
    generating at least a first signal comprising said first voice signal;
    detecting the presence of at least a first echo in said first generated signal;
    in response to said detecting the presence of at least a first echo, reporting said first echo to the first user; and
    in response to said reported first echo, the user moving a position of at least one of the user and said microphone.

2. The method of claim 1, further comprising:
    in response to said reported first echo, changing a position of the user within a room.

3. The method of claim 1, wherein said step of detecting the presence of at least a first echo in said first generated signal comprises detecting a magnitude of said at least a first echo.

4. The method of claim 3, wherein said step of reporting said first echo to the first user comprises reporting a magnitude of said first echo through a visual display.

5. The method of claim 1, wherein said step of reporting said first echo comprises providing an audible signal from a speaker to the first user.

6. The method of claim 1, wherein said step of detecting comprises detecting a change in a spectral content of said first generated signal.

7. The method of claim 1, wherein said step of detecting comprises detecting an amplitude and a time delay of said echo.

8. The method of claim 1, wherein said first user is using a first voice terminal, said method further comprising:
    receiving a second voice signal from at least a second user at a single audio transducer, wherein said second user is using a second voice terminal in communication with said first voice terminal;
    generating a second signal comprising said second voice signal;
    detecting the presence of at least a second echo in said second generated signal; and
    reporting said second echo to the second user.

9. The method of claim 8, further comprising:
    in response to said reported second echo, moving a position of at least one of the second user and a microphone associated with said second user.

10. The method of claim 1, wherein said step of reporting said first echo comprises providing a visual signal from a visual output to a first user.

11. The method of claim 1, further comprising:
    failing to detect the presence of at least a first echo in said first generated signal; and
    in response to failing to detect the presence of at least a first echo, reporting the absence of an echo to the first user.

12. A system of reducing echo in voice communication signals, comprising:
    a receiver operable to convert a voice signal from a first user to an electronic representation of said voice signal and to provide said electronic representation to said electronic signal path, wherein said receiver comprises a single microphone;
    an electronic signal path operable to transmit at least one electronic signal including at least one electronic representation of at least one voice signal obtained from said first user through said single microphone;
    an echo detector operable to detect the presence of an echo associated with said at least one electronic representation transmitted by said electronic signal path and introduced to said electronic representation by said receiver as a result of reverberations in an environment surrounding said receiver;
    an output device in communication with said echo detector operable to output a signal to said first user indicating the detection of an echo in said at least one electronic representation by said echo detector and indicating to said first user that one of a location of said first user and a location of said receiver should be moved within said environment: and
    an acoustical output device for delivering acoustical output to said first user, wherein said acoustical output device is not operable to produce an acoustic output comprising said voice signal from said first user when said receiver is operable.

13. The system of claim 12, further comprising:
    a voice communication device, wherein said receiver, at least a portion of said electronic signal path, said echo detector and said output device are provided as part of said voice communication device.

14. The system of claim 13, wherein said voice communication device comprises at least one of a telephone and a soft telephone.

15. The system of claim 12, further comprising:
- a communication server, wherein said echo detector is provided as part of said communication server; and
- a voice communication device, wherein said output device is provided as part of said voice communication device.

16. The system of claim 12, wherein said output device comprises a visual display.

17. The system of claim 12, wherein said output device comprises a numeric display.

18. The system of claim 12, wherein said output device comprises a speaker.

19. The system of claim 18, wherein said single microphone and said speaker are provided as part of a telephone.

20. A computer readable storage medium containing a program for performing a series of method steps, the method comprising:
- receiving at a single microphone a voice signal from a first user;
- detecting an echo associated with said received voice signal; and
- outputting an indication of said detected echo to said first user, wherein in response to said indication said first user moves at least one of a location of said single microphone and a location of said first user within an environment surrounding said single microphone and said first user.

21. The computer readable storage medium of claim 20, the method further comprising:
- determining a psycho-acoustic effect of said echo.

22. The computer readable storage medium of claim 21, wherein said step of outputting comprises reporting said determined psycho-acoustic effect of said echo to the first user.

23. The computer readable storage medium of claim 21, wherein said psycho-acoustic effect of said echo is determined from an amplitude and a time delay of said detected echo.

24. The computer readable storage medium of claim 20, wherein said first microphone is provided as part of a telephone.

25. A system for reducing echo in outgoing voice signals, comprising:
- means for generating an electronic signal representing a received voice signal, wherein said received voice signal is provided by a first user, wherein said means for generating comprises a microphone, wherein a location of said microphone within a room can be altered by the first user, and wherein a location of the first user relative to said microphone can be altered by the first user;
- means for detecting an acoustic echo in said electronic signal, wherein said means for detecting is in communication with said means for generating; and
- means for outputting a signal to the first user indicating the presence of an acoustic echo in said electronic signal, wherein in response to said first signal the first user alters at least one of the location of said microphone within the room and a location of the first user relative to said microphone.

26. The system of claim 25, wherein said means for detecting is provided as part of a communication server.

27. The system of claim 25, wherein said means for generating, said means for detecting, and said means for outputting are provided as part of a voice communication device.

28. The system of claim 27, wherein said voice communication device comprises a telephone.

29. The system of claim 25, further comprising:
- means for outputting a second signal to the first user indicating the absence of an acoustic echo in the electronic signal.

* * * * *